(12) United States Patent
Reijersen van Buuren

(10) Patent No.: US 9,756,789 B2
(45) Date of Patent: Sep. 12, 2017

(54) BALING DEVICE AND METHOD TO FORM BALES OF CROP MATERIAL

(71) Applicant: LELY PATENT N.V., Maassluis (NL)

(72) Inventor: Willem Jacobus Reijersen van Buuren, Dirksland (NL)

(73) Assignee: LELY PATENT N.V., Maassluis (NL)

(*) Notice: Subject to any disclaimer, the term of this patent is extended or adjusted under 35 U.S.C. 154(b) by 108 days.

(21) Appl. No.: 14/822,920

(22) Filed: Aug. 11, 2015

(65) Prior Publication Data

US 2015/0342121 A1    Dec. 3, 2015

Related U.S. Application Data

(63) Continuation of application No. 13/864,756, filed on Apr. 17, 2013, now Pat. No. 9,131,641, which is a
(Continued)

(30) Foreign Application Priority Data

Nov. 2, 2009   (NL) ...................................... 1037433

(51) Int. Cl.
*A01F 15/07*   (2006.01)
*A01F 15/08*   (2006.01)
(Continued)

(52) U.S. Cl.
CPC ........ *A01F 15/0705* (2013.01); *A01D 89/001* (2013.01); *A01F 15/0883* (2013.01); *A01F 15/18* (2013.01); *A01F 2015/077* (2013.01)

(58) Field of Classification Search
CPC .. A01F 15/0705; A01F 15/0883; A01F 15/18; A01F 2015/077; A01D 89/001
(Continued)

(56) References Cited

U.S. PATENT DOCUMENTS 4,062,172 A   12/1977   Rice et al.
4,262,478 A   4/1981   Pentith
(Continued)

FOREIGN PATENT DOCUMENTS

EP   0064117 A1   11/1982
EP   1264531 A1   12/2002
(Continued)

OTHER PUBLICATIONS

Earlier Search Report for priority document NL1037433 issued on Apr. 9, 2010.
(Continued)

*Primary Examiner* — Jimmy T Nguyen
(74) *Attorney, Agent, or Firm* — Hoyng Rokh Monegier LLP; Ramin Amirsehhi; David P. Owen

(57) ABSTRACT

A baling device to form bales of crop material, including a frame, an intake device, a bale forming device for forming a bale of the crop material, the bale forming device including at least one endless belt to delimit a baling chamber, and a number of guiding elements to guide the endless belt, the outlet of the intake device is located at a fixed position with respect to the frame, and at least three guiding elements are movably mounted with respect to the outlet of the intake device to position for subsequent bales different pairs of two guiding elements of the at least three movable guiding elements at the opposite sides of the outlet.

14 Claims, 3 Drawing Sheets

Related U.S. Application Data continuation of application No. 13/456,228, filed on Apr. 26, 2012, now abandoned, which is a continuation of application No. PCT/NL2010/000146, filed on Oct. 19, 2010.

(51) Int. Cl.
*A01F 15/18* (2006.01)
*A01D 89/00* (2006.01)

(58) Field of Classification Search
USPC .................. 100/35, 40, 87, 88; 56/341
See application file for complete search history.

(56) References Cited

U.S. PATENT DOCUMENTS

| 4,534,285 | A | 8/1985 | Underhill |
| 4,667,592 | A | 5/1987 | Pentith et al. |
| 6,729,118 | B2 | 5/2004 | Viaud |
| 7,530,215 | B2 | 5/2009 | Guiet et al. |
| 9,131,641 | B2 * | 9/2015 | Reijersen van Buuren ............ A01F 15/0705 |

FOREIGN PATENT DOCUMENTS

| EP | 1264532 A1 | 12/2002 |
| EP | 1836890 A1 * | 9/2007 ......... A01F 15/0705 |

OTHER PUBLICATIONS

International Search Report for PCT/NL2010/000146 issued on Jan. 19, 2011.
International Preliminary Report on Patentability for PCT/NL2010/000146 issued on May 8, 2012.

* cited by examiner

BALING DEVICE AND METHOD TO FORM BALES OF CROP MATERIAL

CROSS REFERENCE TO RELATED APPLICATIONS

This application is a continuation of U.S. patent application Ser. No. 13/864,756 filed on 17 Apr. 2013, now U.S. Pat. No. 9,131,641, which is a continuation of U.S. patent application Ser. No. 13/456,228 filed 26 Apr. 2012, now abandoned, which is a continuation of PCT application number PCT/NL2010/000146 filed on 19 Oct. 2010, which claims priority from Netherlands application number 1037433 filed on 2 Nov. 2009. All applications are hereby incorporated by reference in their entireties.

BACKGROUND OF THE INVENTION

1. Field of the Invention

The present invention relates to a baling device to form bales of crop material.

A baling device is an agricultural unit to form bales of crop material. The baling device usually comprises an intake device to take up crop material from a ground surface and a bale forming device to form a bale from the crop material.

2. Description of the Related Art

In a known embodiment, the bale forming device comprises an endless belt guided by guiding rollers. An outlet of the intake device is arranged between two guiding rollers so that crop material is fed between the two guiding rollers towards the endless belt. Due to the feeding of crop material between two guiding rollers a baling chamber is formed by the belt. By further feeding of crop material the baling chamber is filled until a bale with a desired diameter is obtained.

One of the two guiding rollers between which the baling chamber is formed is arranged on a pivotable rear flap of the baling device, so that the opening of the pivotable rear flap releases the bale from the baling chamber. Before the formation of a new bale can be started the pivotable rear flap must be closed. The opening and closing of the rear flap takes considerable time, during which the baling device cannot be used for formation of a new bale. This has the consequence that the intake of new crop material has to be temporarily stopped, by stopping the forward movement of the baling device over the ground surface.

EP 1 264 532, which is hereby incorporated by reference in its entirety, proposes a baling device comprising two baling chambers in which a bale may be formed. During formation of a bale, the bale is transferred from a smaller baling chamber at the front of the baling device to a larger baling chamber at the back of the baling device.

Three movable arms are provided each carrying a movable guiding roll guiding an endless belt together with fixed guiding rolls to form bales. A baling chamber may be formed between two movable guiding rollers arranged at opposite sides of the outlet of the intake device. A conveyor belt is provided to close the bottom of the respective bale forming chamber and to transport the bale from the first baling chamber to the second baling chamber.

A drawback of the device of EP 1 264 532 is that the intake device must be configured to deliver crop material at different locations. In a first embodiment, the intake device is provided with a movable conveyor belt to transport, dependent on the position of the movable conveyor belt, crop material to the first or the second bale forming chamber. In an alternative embodiment, the whole intake device is made movable with respect to the frame, so that the intake device can deliver, dependent on its position, crop material to the first of second bale forming chamber. The provision of such intake device configured to deliver crop material at different locations makes the baling device relative complex.

Another drawback of the baling device of EP 1 264 532 is that the baling device is relatively long due to the presence of two bale forming chambers. Furthermore, the baling device of EP 1 264 532 requires a fixed guiding roll at the top back end of the baling device to avoid that the back end part of the endless belt comes into contact with the endless belt part forming the baling chamber.

BRIEF SUMMARY OF THE INVENTION

It is an aim of the invention to provide a baling device lacking one or more of the above drawbacks, or at least to provide an alternative baling device.

The aim of the invention is achieved by a baling device to form bales of crop material, the bales each have a cylindrical shape, the baling device comprising:

an intake device having an outlet and
a bale forming device for forming a bale of said crop material,
wherein the bale forming device comprises
at least one endless belt to delimit a baling chamber,
a first pair comprising a first and second moveable guiding element,
a second pair comprising a third and fourth guiding element,
the at least four guiding elements of said two pairs are arranged for guiding the at least one endless belt,
each pair of guiding elements is arranged to be moved between an intake position and a release position,
the two guiding elements of a pair being in the intake position are arranged at opposite sides of the outlet,
the endless belt is arranged on the guiding elements to receive, during formation of a bale, crop material from the outlet of the intake device between two guiding elements of a pair arranged at opposite sides of the outlet, this baling chamber to be formed between the two guiding elements,
the pair of moveable guiding elements between which the complete bale is formed is arranged for being moved from the intake position to the release position.

By arranging the outlet of the intake device at a fixed position on a frame, and by providing three movable guiding elements which are alternately located at opposite sides of the outlet to receive crop material between the respective guiding elements provides a simple and efficient system for the formation of bales of crop material.

A baling chamber can be formed by feeding crop material between two of the three movable guiding elements so that the bale is formed. When the bale is finished, the movable guiding elements between which the baling chamber is formed may be moved to position the space between the two movable guiding elements at the back end of the baling device. The distance between the two movable guiding elements may be increased so that the bale can be released from the baling device. Therefore, no tailgate has to be provided in order to make release of a bale possible. The absence of such tailgate is desirable as opening and closing of a tailgate takes considerable time.

It is remarked that any further device arranged between the intake device and the bale forming device, is regarded as part of the intake device. The outlet of such further device towards the bale forming device should be regarded as outlet of the intake device.

In an embodiment, the bale forming device comprises at least four movable guiding elements. The provision of four movable guiding elements has the advantage that an alternating one of the at least four movable guiding elements may be used to form a back end support of the endless belt. As a result no separate fixed support element has to be provided which has to be positioned relative high at the back side of the baling device to make passing of the movable guiding elements between the baling chamber and the fixed support element possible. Thus, the use of a movable guiding element as back end support of the endless belt has a positive influence on the overall dimensions of the baling device.

Another advantage of at least four movable guiding elements is that a first and second movable guiding element may form a first pair of two guiding elements, and wherein a third and fourth movable guiding element may form a second pair of two guiding elements. The position of a bale in the baling device is mainly determined by the position of the movable guiding elements, in particular the movable guiding elements between which the baling chamber is formed. When for each bale two separate movable guiding elements may be used, the position of each bale may be separately controlled.

In one embodiment five or six movable guiding elements are provided. The advantage of five or six movable guiding elements is that alternately two movable guiding elements may be used for formation of a bale, two movable guiding elements may be ready to be used for the formation of bale after formation of a previous bale is finished, and one or two further movable guiding elements may be used to form back end support for the endless belt so that the endless belt at the back end of the baling device does not interfere with the endless belt part surrounding the bale to be formed. By reservation of two movable guiding elements, i.e. positioned close by the outlet of the intake device, for the formation of a new bale, minimum time is required to restart baling after formation of a previous bale has finished.

In another embodiment, each of the movable guiding elements is arranged on an arm which arm is rotatable with respect to a common axis of rotation.

In an embodiment, each of the movable guiding elements is arranged on an arm and each arm is pivotably mounted on a rotatable element, and wherein for each arm an actuator is provided between the arm and the rotatable element to position the arm in a desired rotational position with respect to the rotatable element. The angular distance between two movable guiding elements may have to change during the different actions of the baling device. For instance, during formation of a bale two movable guiding elements between which a baling chamber is formed have to be arranged at a distance smaller than the diameter of a complete bale, while during release of the bale from the baling device, the same two movable guiding elements have to be arranged at a distance larger than the diameter of the bale.

By arranging the guiding rollers on arms which can be arranged at different angular positions with respect to the rotatable element, the angular distance between two movable guiding elements may be adjusted. Hydraulic actuators or other suitable actuators may be provided to position the arm in a desired position with respect to the rotatable element.

As an alternative or in addition thereto, the baling device may comprise a guiding rail to guide the movable guiding elements at least along the outlet of the intake device. At the outlet of the intake device, the movable guiding elements run close to other parts of the baling device, in particular close to rollers of the intake device forming the outlet of the intake device. To avoid any collision between the movable guiding rollers and the rollers of the intake device, a guiding rail may be provided to control the movement of the movable guiding rollers more accurately.

In another embodiment, the guiding rail forms a continuous loop so that the movement of the movable guiding rollers is continuously guided by a guiding rail. Any suitable actuator may be provided to move the movable guiding elements along the guiding rail.

The invention further provides a method for forming at least two bales in the baling device, comprising the steps of:
  taking up crop material with the intake device from the ground surface via the inlet and pressing the crop material out of the outlet of the intake device,
  forming a baling chamber of the endless belt by feeding crop material between two movable guiding elements arranged at opposite sides of the outlet,
  filling the baling chamber with crop material until a bale of desired diameter is formed,
  moving the two movable guiding elements to a release position to release the bale from the baling chamber, and
  arranging another pair of two movable guiding elements at opposite sides of the outlet for formation of a baling chamber for a subsequent bale between the other pair of two movable guiding elements.

In an embodiment, the bale forming device comprises at least four movable guiding elements, wherein a first and second movable guiding element form a first pair of two guiding elements, and wherein a third and fourth movable guiding element form a second pair of two guiding elements, and wherein alternating pairs are arranged at opposite sides of the outlet for formation of a baling chamber between the respective pair of two movable guiding elements.

Preferably one or more other movable guiding elements are used to provide back end support for the endless belt of the bale forming device.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
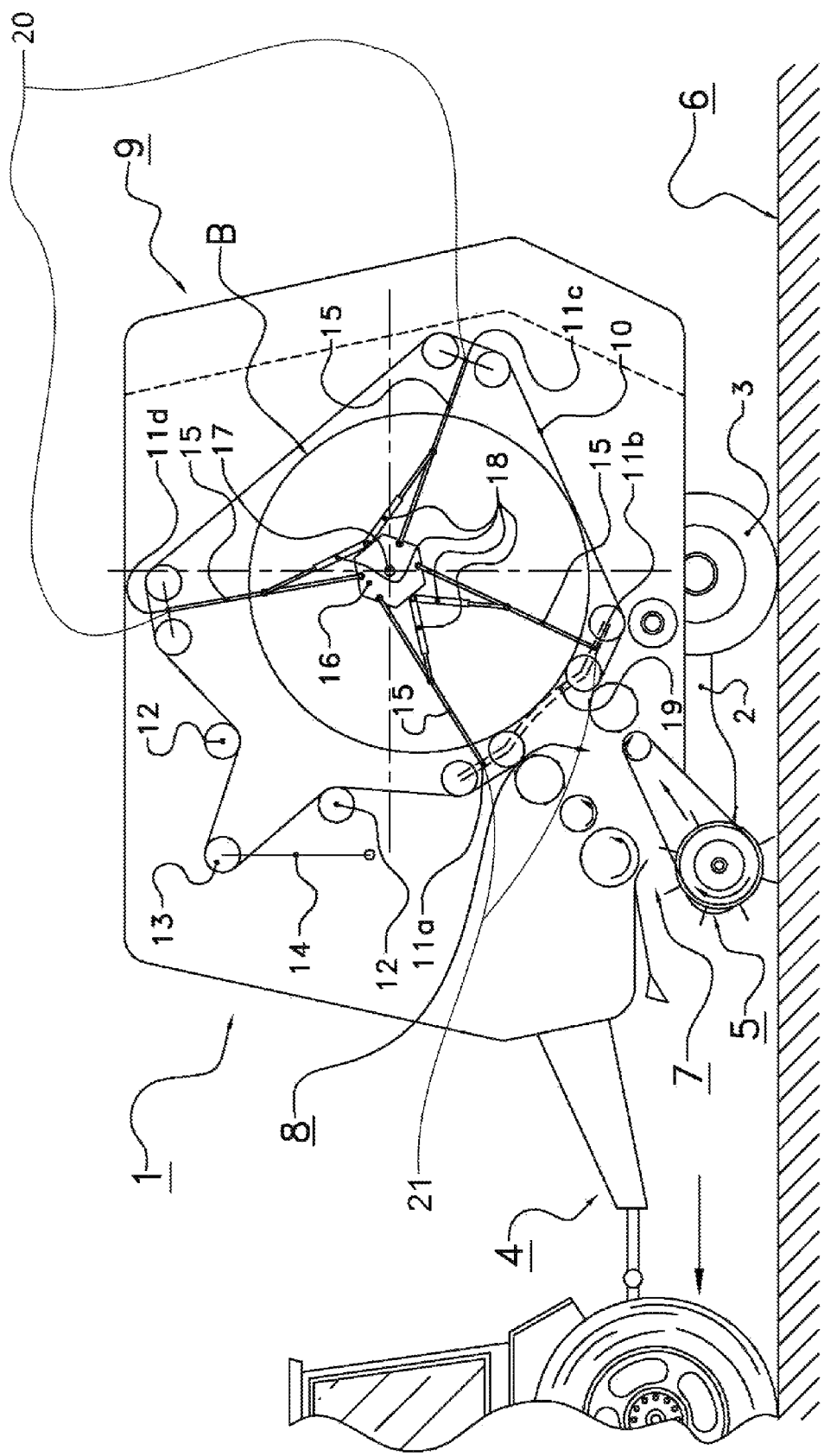
FIG. 1 shows a side view of a baling device according to the invention during formation of a bale.

The following is a description of certain embodiments of the invention, given by way of example only and with reference to the drawings. Referring to FIG. 1, it shows a baling device, generally indicated with the reference numeral 1. The baling device 1 comprises a frame 2 which is supported by wheels 3. The baling device 1 is configured to be connected at its front end 4 to a pulling vehicle, for instance a tractor.

The baling device 1 comprises an intake device 5 to take in crop material, such as silage, grass, hay, from a ground surface 6. The intake device 5 comprises an inlet 7 and an outlet 8.

Via the inlet 7 crop material is taken from the ground and transported to the outlet 8. A roll provided at the inlet 7 may be provided with tines to facilitate the picking up of crop material.

A bale forming device 9 is arranged on the frame 2 to form bales of crop material. The bale forming device 9 comprises an endless belt 10 and a number of movable guiding elements 11a, 11b, 11c, 11d, and fixed guiding elements 12, and a pre-tensioned guiding element 13.

The pre-tensioned guiding element 13 is placed under pretension by a tensioner 14 in order to tightly pull the endless belt 10 over the movable and fixed guiding elements. A driving device (not shown) is provided to drive the endless belt in a driving direction.

As shown in FIG. 1, two movable guiding elements 11a, 11b are arranged at opposite sides of the outlet 8 of the intake device 5 to receive crop material between the two movable guiding elements 11a, 11b. The endless belt part between the two movable guiding elements 11a, 11b has formed a baling chamber in which a bale B is formed of crop material taken in via the intake device 5.

The other two movable guiding elements 11c and 11d have been arranged at suitable locations so that the endless belt 10 at the back end of the baling device 1 is supported. In this way it is avoided that the endless belt part at the back end of the baling device contacts the part of the baling device 1 forming the baling chamber. As the movable guiding element 11c, 11d provide this back end support, no separate fixed guiding roller has to be positioned at the back end of the baling device 1.

Each movable guiding element 11a, 11b, 11c, 11d comprises two rollers, and is mounted on a first end of an arm 15. Each arm 15 is pivotably mounted on a rotatable element 16, which is rotatable about a common pivot axis 17. An hydraulic actuator 18 is provided between each arm 15 and rotatable element 16 to locate the arm 15, and therewith the movable guiding element 11a, 11b, 11c, 11d in a desired angular position with respect to the rotatable element 16. In this way the angular distance between two adjacent movable elements may be adapted.

This is of importance as for instance during formation of a bale in a baling chamber between two adjacent movable guiding elements 11a, 11b the distance between the movable guiding elements 11a, 11b has to be smaller than the diameter of a complete bale, while for releasing the bale B from the baling device, the distance between two same movable guiding elements 11a, 11b has to be larger than the diameter of the bale B.

Figure 2:
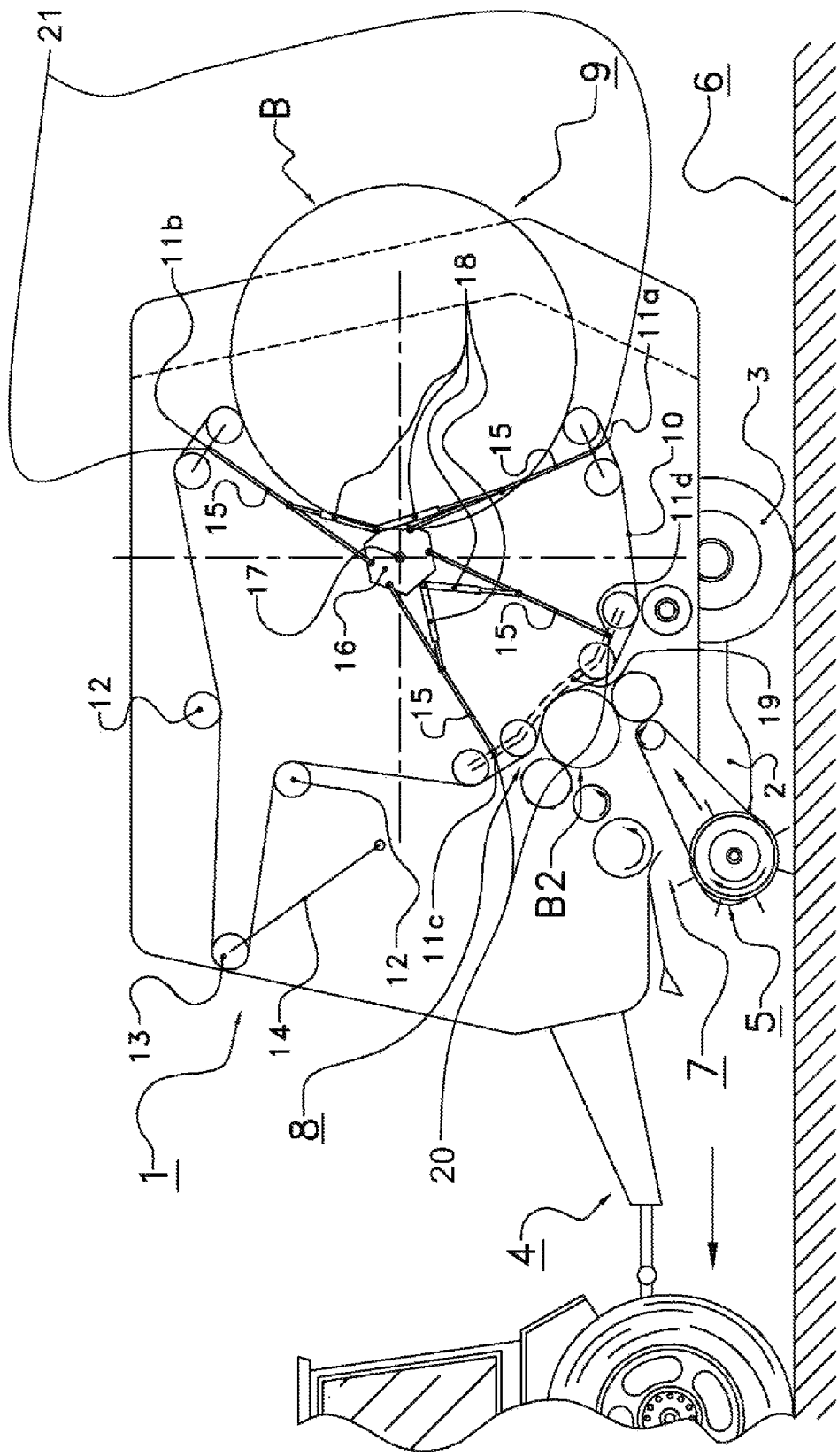
FIG. 2 shows a side view of the baling device of FIG. 1 during release of a bale.

In FIG. 2, the first pair (21) of movable guiding elements 11a, 11b have been brought from the intake position as shown in FIG. 1 to the release position as shown in FIG. 2. In this position, the angular distance between the two movable guiding elements 11a, 11b has been increased to make ejection of the bale from the bale forming device 9 possible.

In the meantime, the other pair (20) of movable guiding elements 11c, 11d have been moved from the back end support position (FIG. 1) to the intake position (FIG. 2) at opposite sides of the outlet 8 so that crop material can be received and formed into a bale while a baling chamber is formed by the part of the endless belt 10 between the two movable guiding elements 11c, 11d.

As shown in FIG. 2, the formation of a new bale B2 is already started before the bale B is completely released from the baling device 1. This is advantageous since in the period that no bale can be formed in the baling chamber, also no crop material can be fed into the bale forming device 9. It is desirable that this period is as short as possible, and thus the movable guiding elements 11c, 11d should as quickly as possible be moved from a back end support position to the intake position. However, at least one of the movable guiding elements 11c, 11d, in particular the movable guiding element 11d can only be moved away from the back end support position, when the other pair of movable guiding elements 11a, 11b has been moved to the back end of the baling device 1 to form a back end support for the endless belt 10.

Therefore, it may be advantageous to provide more than four movable guiding elements 11a, 11b, 11c, 11d, for instance five or six movable guiding elements. In such embodiment, two new movable guiding elements may already be positioned in a position close to the outlet 8 of the intake device 5 so that directly after a bale has finished and the movement of the movable guiding elements away from the intake position has been started, the new pair of movable guiding elements may be moved to the intake position for the formation of a new bale.

In the shown embodiment, the movable guiding elements 11a, 11b, 11c, 11d, are rotated in a single direction between the intake position (11a, 11b in FIG. 1), the release position (11a, 11b in FIG. 2) and the back end support position (11c, 11d in FIG. 1). It is remarked that in particular in the release position and the back end support position, the respective movable guiding elements do not have to remain in a fixed position with respect to the frame, but also may be moved. As long as the movable guiding elements are used for release of a bale and/or for back end support of the endless belt 10, the movable guiding elements are regarded to be in the release position and/or back end support position, respectively.

The four movable guiding elements function as two pairs. The movable guiding elements 11a, 11b form a first pair and the movable guiding elements 11c, 11d form a second pair. Each pair is moved between the different functions. In an alternative embodiment, the different functions of the movable guiding elements may be formed by alternating pairs of the movable guiding elements.

In dashed lines a guiding rail 19 is indicated at the part of the trajectory of the movable guiding elements 11a, 11b, 11c, 11d where the movable guiding elements are guided along the outlet 8 of the intake device 5. The provision of such guiding rail 19 which for instance may cooperate with a guiding element, such as a guiding pin on the respective movable guiding elements 11a, 11b, 11c, 11d, may improve the accuracy of movement of the movable guiding elements. The guiding rail 19 is in the shown embodiment only provided at the part of the trajectory where the movable guiding elements 11a, 11b, 11c, 11d are close to the outlet 8 to avoid that movable guiding elements 11a, 11b, 11c, 11d come into contact with any of the parts of the intake device 5. In other parts of the trajectory the movable guiding elements 11a, 11b, 11c, 11d are less likely to come into contact with other parts of the baling device 1, and therefore no guiding rail is provided in this part of the trajectory.

In an alternative embodiment, the guiding rail 19 may form a continuous loop to guide the movable guiding elements 11a, 11b, 11c, 11d, along their whole trajectory between different positions and functions. Any other suitable device or system to guide the movable guiding elements 11a, 11b, 11c, 11d along a trajectory between an intake position, a release position and/or a back end support position may be applied.

Figure 3:
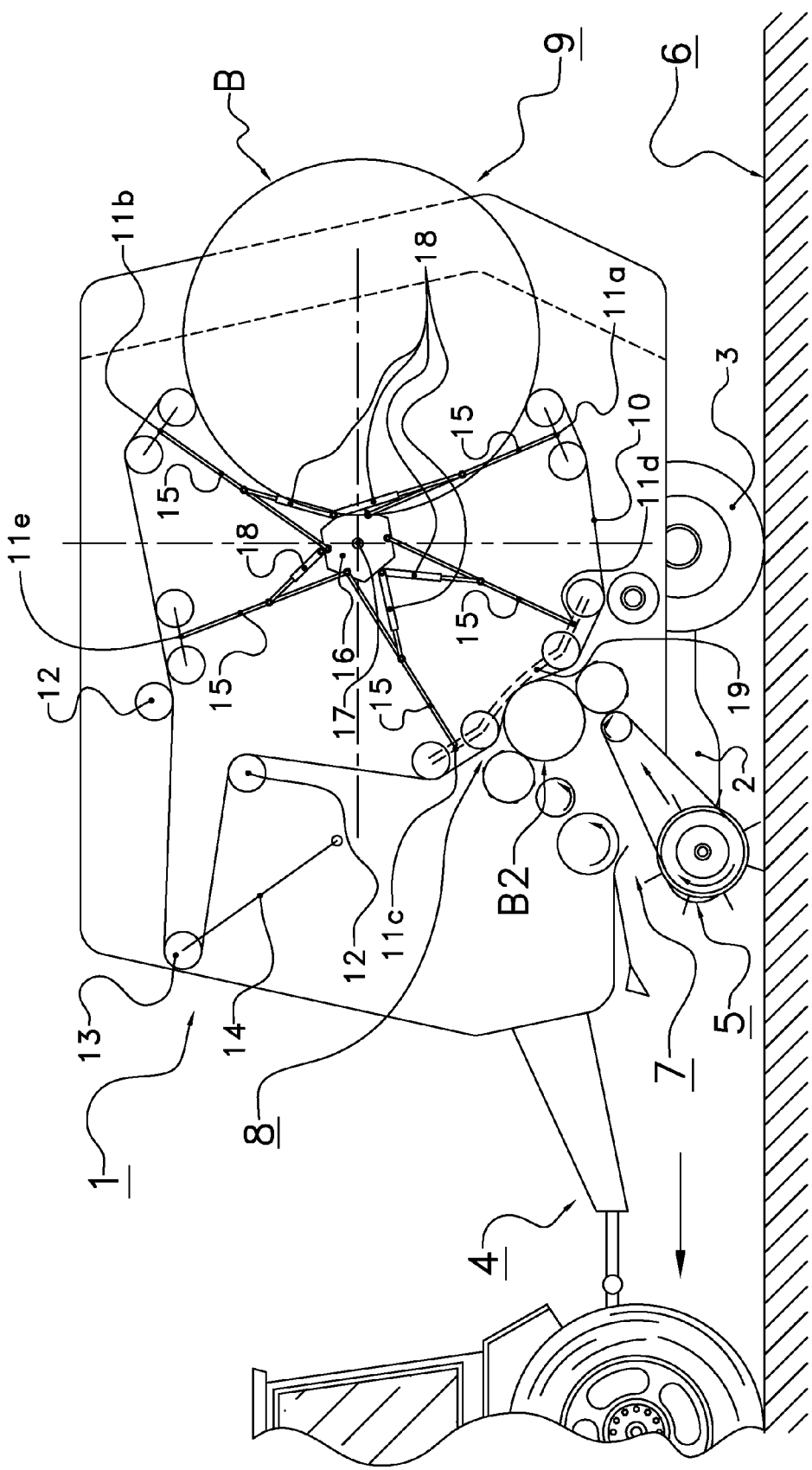
FIG. 3 shows a baling device with moveable guiding elements 11a,11b, 11c, 11d, and 11e, according to an aspect of the invention.

The baling device of FIGS. 1, 2, and 3 may be used as follows:

A tractor pulls the baling device 1 over a ground surface 6 with crop material. The crop material is taken up by the intake device 5 via the inlet 7 and pressed out of the outlet 8 towards the bale forming device 9. Two movable guiding elements 11a, 11b are arranged at opposite sides of the outlet 8 to receive crop material from the outlet 8 between them, therewith forming a baling chamber of part of the endless belt 10 between the two movable guiding elements 11a, 11b. The crop material is fed to the bale forming device 9 until a bale of desired diameter is formed. During formation of the bale the two other movable guiding elements 11c, 11d are held in the back end support position as shown in FIG. 1.

When a bale of desired diameter is formed, the feeding of new crop material to the bale forming device 9 has to be stopped, for instance by stopping the tractor, or by stopping intake in the intake device, for instance by closing the inlet 7 or lifting it to a height that no further crop material can be taken in. In another embodiment the intake device 5 may comprise a device which temporarily holds the crop material taken in by the intake device 5. Such device may for instance be a pre-baling device which forms the temporarily accumulated crop material in a small bale which may be ejected into the bale forming device 9 when this bale forming device 9 is ready to receive crop material from the intake device.

The pair of movable guiding elements 11a, 11b, between which the complete bale is formed, are moved from the intake position to the release position. In some embodiments the two movable guiding elements 11a, 11b may be brought in an intermediate position in which netting may be provided around the bale. Such netting is arranged on the bale to avoid falling apart of the bale after the bale is released from the baling device 1.

The other pair of movable guiding elements 11c, 11d, is moved from the back end support position to the intake position (FIG. 2). In this intake position the formation of a new bale between the second pair of movable guiding elements 11c, 11d may directly be started, i.e. even before the previous bale is completely released from the bale forming device, as shown in FIG. 2.

When the bale B is released from the baling device 1, the two movable guiding elements 11a, 11b may be held or moved to a back end support position, for instance the position of the two movable guiding elements 11c, 11d shown in FIG. 1.

When the formation of bale between the movable guiding elements 11c, 11d has finished, the two movable guiding elements 11c, 11d may be moved to the release position, and the movable guiding elements 11a, 11b may be moved to the intake position for the formation of yet a new bale. In this way the position of the four movable guiding elements 11a, 11b, 11c, 11d, may be changed in a single direction to continuously or semi-continuously form bales of crop material in the bale forming device 9.

As described above the provision of further movable guiding elements may be advantageous to minimize the time between end of the formation of a bale, and starting the formation of a new bale. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A baling device to form bales of crop material, the bales each having a cylindrical shape, the baling device comprising:
   an intake device comprising an outlet and
   a bale forming device for forming a bale of said crop material,
   wherein the bale forming device comprises
      at least one endless belt to delimit a baling chamber,
      a first moveable guiding element pair comprising a first and second moveable guiding element,
      a second moveable guiding element pair comprising a third and fourth moveable guiding element,
   wherein the at least four moveable guiding elements of said two moveable guiding element pairs each comprises two rollers,
   wherein the at least four moveable guiding elements of said two moveable guiding element pairs are arranged for guiding the at least one endless belt,
   wherein each pair of moveable guiding elements is arranged to be moved between an intake position and a release position,
   wherein the two moveable guiding elements of a moveable guiding element pair in the intake position are arranged at opposite sides of the outlet,
   wherein the endless belt is arranged on the moveable guiding elements to receive, during formation of a bale, crop material from the outlet of the intake device accumulated between the two guiding elements of the moveable guiding element pair arranged at opposite sides of the outlet, the baling chamber to be formed between the two guiding elements to form the crop material into a complete bale, and
   wherein the pair of moveable guiding elements between which the complete bale is formed is arranged for being moved from the intake position to the release position,
   wherein the angular distance between two movable guiding elements of the pair of moveable guiding elements are changeable,
   wherein during formation of a bale, two of the movable guiding elements between which the baling chamber is formed are arranged at a distance smaller than a diameter of the complete bale, wherein during release of the bale from the baling device, the same two movable guiding elements have to be arranged at a distance larger than the diameter of the complete bale.

2. The baling device of claim 1, wherein the baling device further comprises a frame, the outlet of the intake device is located at a fixed position with respect to said frame.

3. The baling device of claim 1, wherein every pair of moveable guiding elements can further be moved from the release position into a back end support position for providing a back end support for the endless belt and from the back end support position into the intake position.

4. The baling device of claim 1, wherein different pairs of moveable guiding elements do not have one of the moveable elements in common.

5. The baling device of claim 1, wherein the bale forming device comprises five or six moveable guiding elements.

6. The baling device of claim 1, wherein the baling device is arranged such that two moveable guiding elements of said first moveable guiding element pair are used for formation of a bale, the two moveable guiding elements of said second moveable guiding element pair are used as a back end support for the endless belt.

7. The baling device of claim 1, wherein each of the moveable guiding elements is arranged on an arm and each arm is pivotally mounted on a rotatable element, and wherein for each arm an actuator is provided between the arm and the rotatable element to position the arm in a desired rotational position with respect to the rotatable element.

8. The baling device of claim 1, wherein each of the moveable guiding elements is arranged on an arm which arm is rotatable with respect to a common axis of rotation.

9. The baling device of claim 1, wherein the baling device comprises a guiding rail to guide the moveable guiding elements at least along the outlet of the intake device.

10. The baling device of claim 1, wherein the guiding rail forms a continuous loop.

11. The baling device of claim 1, wherein each moveable guiding element comprises one or more rollers.

12. The baling device of claim 1, wherein the other pair of moveable guiding elements is arranged for being moved into the intake position such that the two moveable guiding elements of this other pair are arranged at the opposite sides of the outlet such that formation of a new bale can be started using the moveable guiding elements of the other pair.

13. A method for forming at least two bales,
the bales each having a cylindrical shape,
the method comprising the steps of:
providing a baling device comprising:
an intake device comprising an outlet and
a bale forming device for forming a bale of said crop material,
wherein the bale forming device comprises
at least one endless belt to delimit a baling chamber,
a first moveable guiding element pair comprising a first and second moveable guiding element,
a second moveable guiding element pair comprising a third and fourth moveable guiding element,
wherein the at least four moveable guiding elements of said two moveable guiding element pairs each comprises two rollers,
wherein the at least four moveable guiding elements of said two moveable guiding element pairs are arranged for guiding the at least one endless belt,
wherein each pair of moveable guiding elements is arranged to be moved between an intake position and a release position,
wherein the angular distance between two of the movable guiding elements are changeable,
wherein the two moveable guiding elements of a moveable guiding element pair in the intake position are arranged at opposite sides of the outlet,
taking up crop material with the intake device from the ground surface,
pressing the crop material out of the outlet of the intake device,
forming a baling chamber delimited by the at least one endless belt by feeding crop material between said two moveable guiding elements arranged at opposite sides of the outlet and forming said pair,
filling the formed baling chamber with crop material until a bale of desired diameter is formed,
moving the pair comprising the two moveable guiding elements into the release position to release the bale from the baling chamber, and
arranging said another pair comprising two moveable guiding elements at opposite sides of the outlet for formation of a baling chamber for forming a subsequent bale between the other pair of two moveable guiding elements,
wherein during formation of a bale, two of the movable guiding elements between which the baling chamber is formed are arranged at a distance smaller than a diameter of a complete bale, wherein during release of the bale from the baling device, the same two movable guiding elements have to be arranged at a distance larger than the diameter of the complete bale.

14. The method of claim 13, wherein alternate moveable guiding element pairs are arranged at opposite sides of the outlet for formation of a baling chamber between the moveable guiding elements of the respective pair.

\* \* \* \* \*